UNITED STATES PATENT OFFICE.

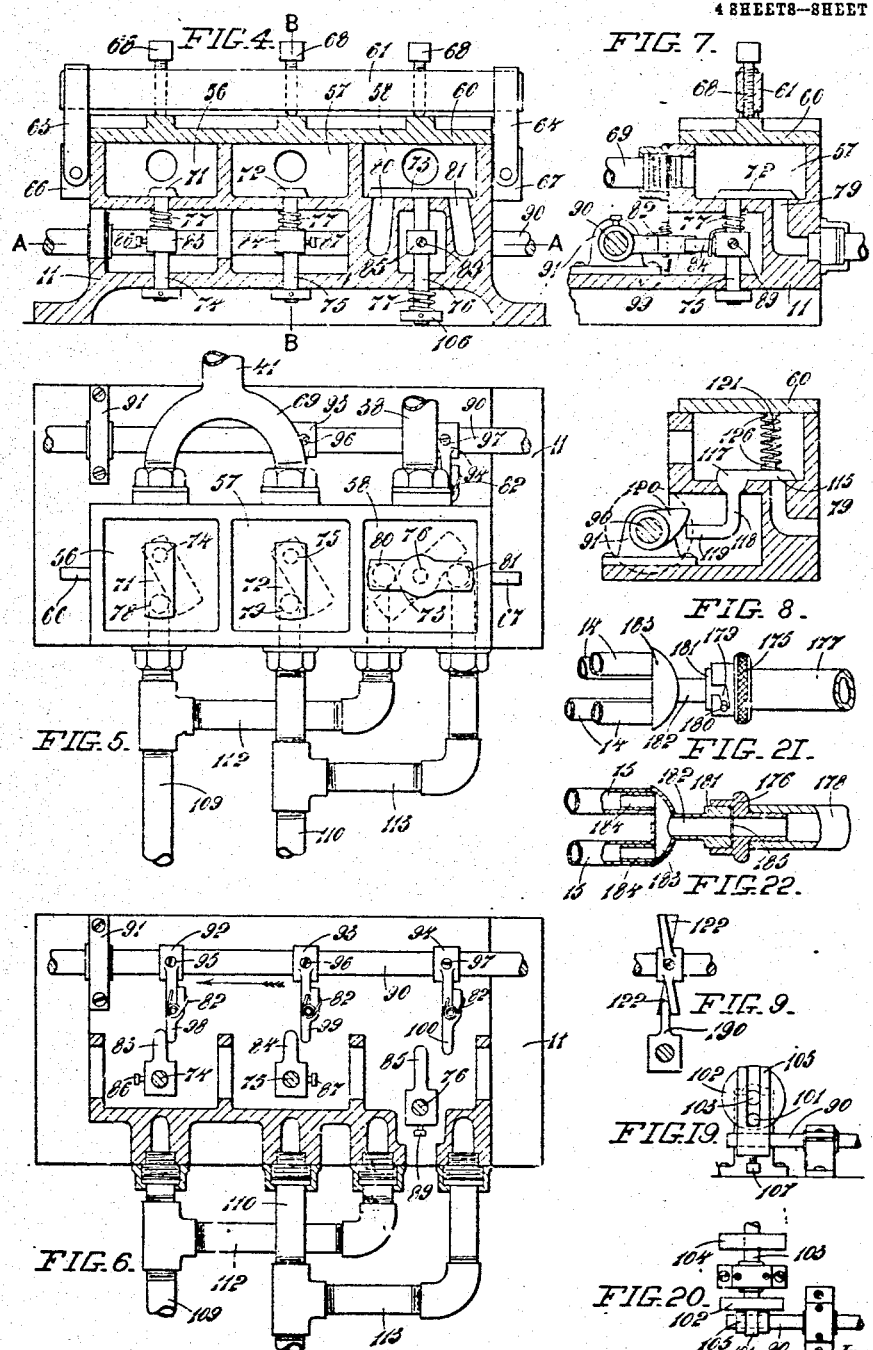

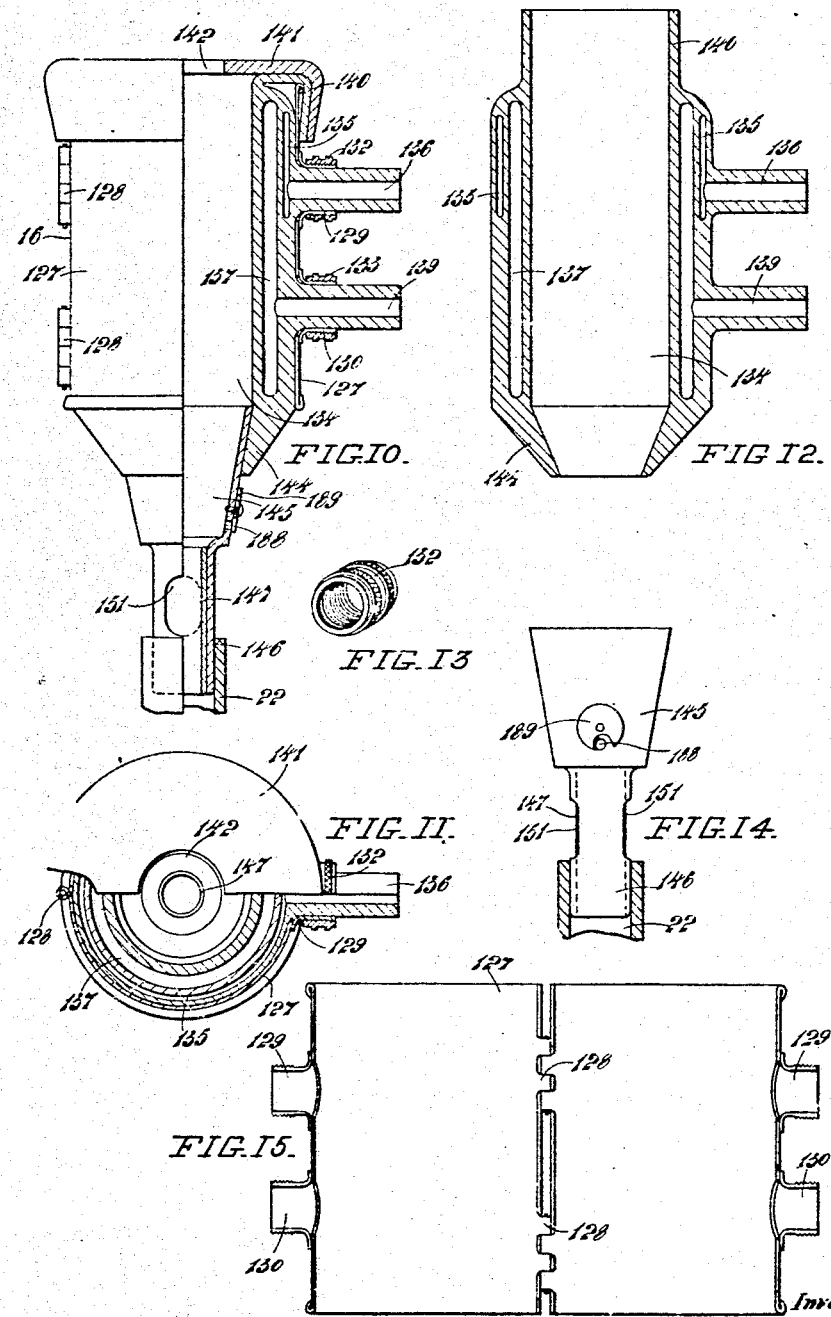

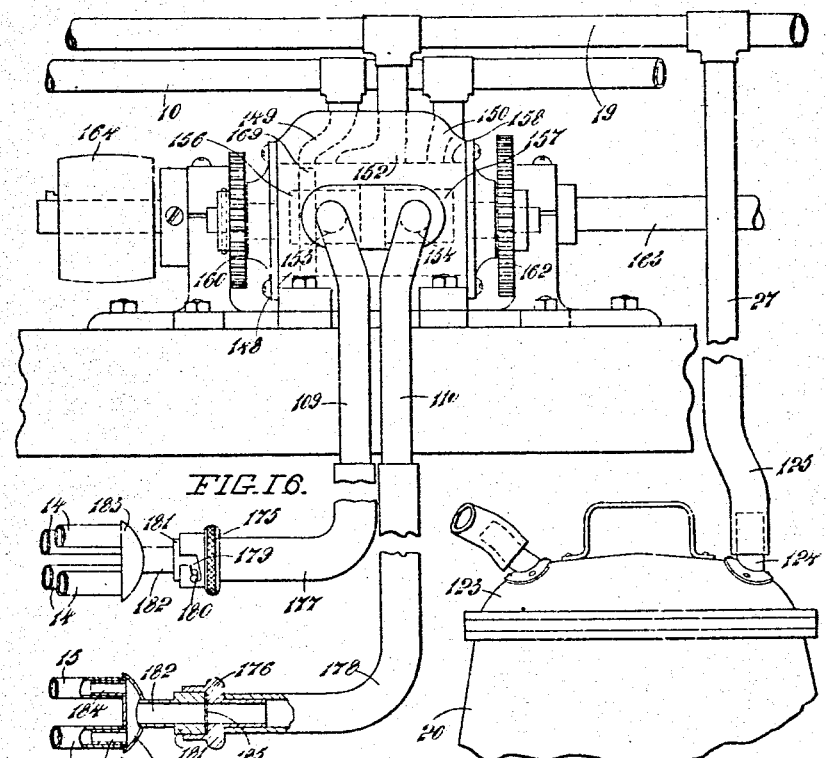
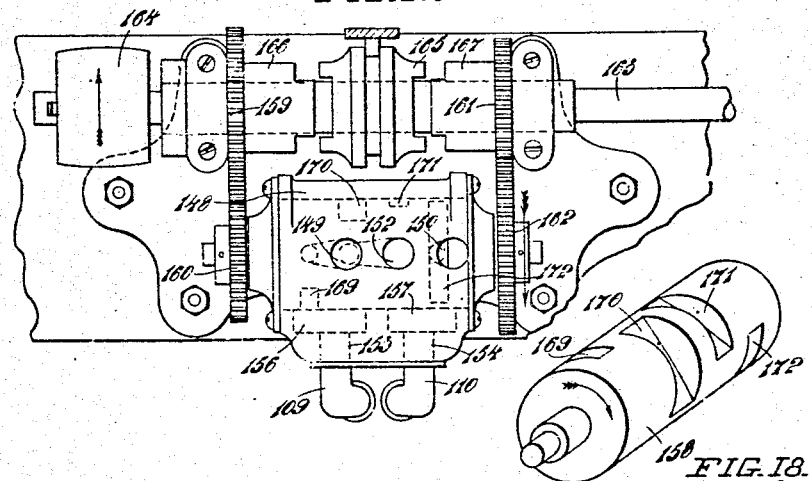

ROBERT ANDREW WIGGINS AND CHARLES BRISTOW, OF CHRISTCHURCH, NEW ZEALAND.

MILKING MACHINERY.

955,732.  Specification of Letters Patent.  Patented Apr. 19, 1910.

Application filed February 28, 1908. Serial No. 418,405.

*To all whom it may concern:*

Be it known that we, ROBERT ANDREW WIGGINS and CHARLES BRISTOW, subjects of His Majesty the King of Great Britain and Ireland, residing at Christchurch, in the Provincial District of Canterbury, Dominion of New Zealand, have invented new and useful Improvements in Milking Machinery, of which the following is a specification.

This invention relates to milking machinery of the type wherein milk is expressed from the teat by air pressure produced in a flexible pouch which receives the teat.

According to this invention the rapidity of milking is much increased by alternating a partial vacuum with the air pressure in the teat pouches, and the teat cups containing the pouches are retained upon the teats by means of a low vacuum.

Figure 1:
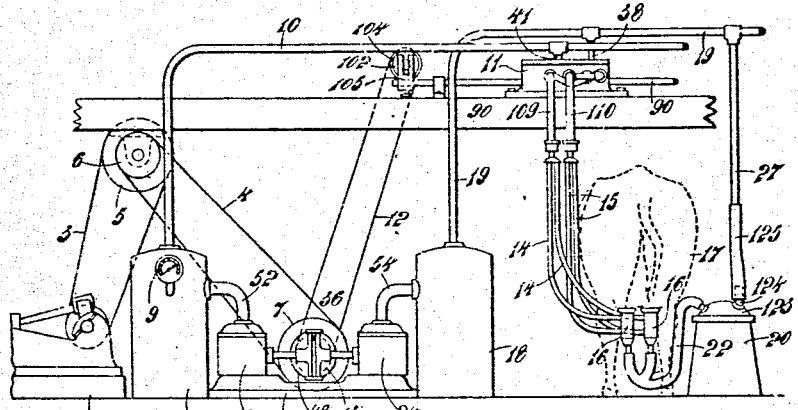
Figure 2:
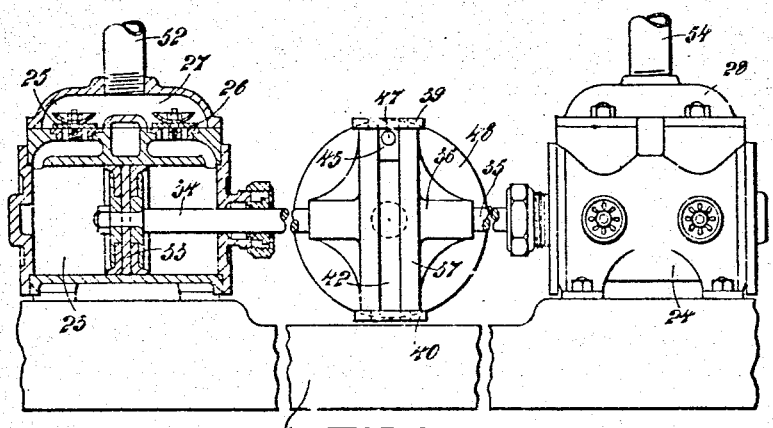

In the accompanying drawings:—Figure 1 is a general arrangement in side elevation. Fig. 2, an elevation partly in section, and Fig. 3, a corresponding plan partly in section of an air pump. Fig. 4, is a side sectional elevation of a controller, Fig. 5, a plan thereof, with its cover removed, Fig. 6 is a sectional plan on line A—A, of Fig. 4 and Fig. 7, a sectional elevation on line B—B, Fig. 4. Fig. 8 is a transverse sectional elevation showing a modified form of controller. Fig. 9 is a plan of a cam and detent. Figs. 10 and 11 are respectively an elevation, partly in section, and a plan partly in section of a teat cup. Fig. 12, a sectional elevation of a teat pouch, Fig. 13, an end perspective elevation of a screw socket. Fig. 14, an elevation of a nozzle. Fig. 15, an elevation of a teat cup, casing opened out. Fig. 16 is an elevation, and Fig. 17 a plan of the apparatus showing a modified form of the controller. Fig. 18 is a perspective view of a revolving valve. Fig. 19 is a front elevation, and Fig. 20, a plan of mechanism for reciprocating the shaft of the controller shown in Figs. 4 to 7 inclusive. Fig. 21 is a plan, and Fig. 22, a sectional plan of a pipe coupling.

The various parts of the apparatus are shown combined in the general arrangement of Fig. 1 and comprise an air pump 1, driven by any convenient motive power, (the drawing showing a gas engine 2 for this purpose). The power is conveyed through the medium of belts 3 and 4 and pulleys 5, 6 and 7. A compression chamber 8 contains air which is compressed therein by the pump 1, a gage 9 being provided to indicate the pressure. A pipe 10 and its branch pipe 41 conduct the compressed air to the controller 11 which is operated by a belt 12 from a pulley 13 upon the pump 1. Compressed air passes intermittently from the controller through flexible pipes 14 and 15 to cups 16, fitting upon the teats of the cow 17 (indicated by dotted lines). A vacuum vessel 18 is voided of air by the pump 1 and is in communication with the controller through a pipe 19 and branch pipe 38 and with a closed milk pail 20 by a down pipe 27. A flexible pipe 22 connects the milk pail to the cups 16 in manner hereinafter described.

Figure 3:
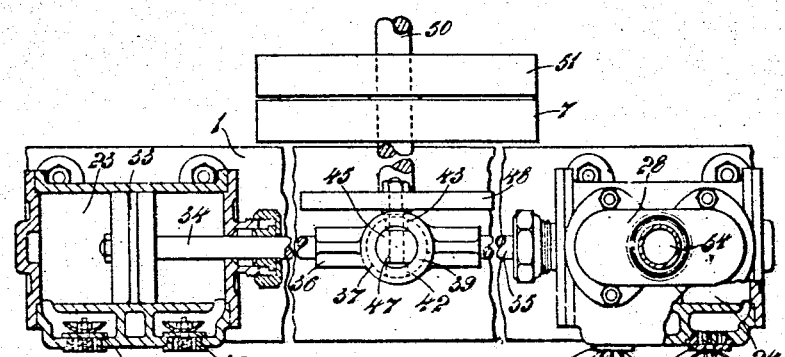

The pump 1 is shown on a large scale in Figs. 2 and 3. The cylinders 23 and 24, with their parts, are similar to each other, in all respects, with the exception that the valves 25 and 26 in the chest 27 of the cylinder 23 are arranged to allow the air to pass to the compression chamber 8 while similar valves in the corresponding chest 28 of the cylinder 24 are reversed to allow air to be drawn from the vacuum vessel 18 and to be discharged into the atmosphere through the valves 31 and 32. The valves 29 and 30 allow air to be drawn into the cylinder 23 from the atmosphere. A double acting piston, 33, in the cylinder 23, and a corresponding piston in the cylinder 24 have piston rods 34 and 35 respectively connected to a cross-head 36. The central part 37, of the cross head is cylindrical and has tubular strengthening flanges 39 and 40 at its ends and slots 42 and 43 extending through the greater part of the length of its sides. A slide block 45 fits the interior of the tubular part 37 and receives a pin 47 projecting from the face of a disk 48 and passing through the slots 42 and 43. The pulley 7 and the disk 48 are secured upon a shaft 50, whereon is also mounted a loose pulley 51. The rotation of the shaft 50 reciprocates both pistons, and air is driven from the cylinder 23, through the pipe 52 into the compression chamber 8 (Fig. 1), while simultaneously air is drawn into the cylinder 24 through the pipe 54 from the vacuum vessel 18 (Fig. 1).

The controller is clearly illustrated in Figs. 4, 5, 6 and 7, and comprises three integral valve chests 56, 57 and 58 closed air tight by a single cover 60, which is secured in position by a cross bar 61 retained by loops 63 and 64 pivoted to lugs 66 and 67 integral with the valve chests. Screws 68 screwed through the bar bear upon the cover which is thus clamped upon the valve chests. The branch pipe 41 has a bifurcated end 69 and admits compressed air from the compression chamber 8 to the valve chests 56 and 57, and air is drawn out of the chest 58 through the branch pipe 38 and through the vacuum chamber 18. Valves 71, 72 and 73 are pivoted in the chests 56, 57 and 58 respectively, by their stems 74, 75 and 76. The valves 71, and 72 cover ports 78 and 79, respectively, and the valve 73 covers ports 80 and 81 formed in the bottom of the valve chests. Detents 83, 84 and 85 are secured upon the stems 74, 75 and 76, respectively, by screws 86, 87 and 89, and springs 77 in compression between the detents 83 and 84 and the bottom of the chest keep the valves 71 and 72 down upon their seats. In the case of the stem 76, its spring 77 is located between the bottom of the controller and washer 106 secured upon the said stem.

The valves 71, 72 and 73 are normally retained in the positions shown in Fig. 5 by the springs 77 which have one end secured to the bottom of the valve chest and their other ends respectively fixed to the detents 83, 84 and the washer 106. A shaft 90, slidable in bearings (one of which, 91, is shown in the drawings) has triggers 92, 93 and 94 secured upon it by screws 95, 96 and 97. The toes 98, 99 and 100 of these triggers are hinged by stop joints and have springs 82 which normally retain the said toes in the positions shown in Fig. 6. The shaft 90 is reciprocated by a pin, 101 (see Figs. 1, 19 and 20) projecting from the face of the disk 102 secured upon a counter shaft 103. The belt 12 passes around a pulley, 104 and rotates the shaft 103. The pin 101 engages a forked bracket 105 secured upon the shaft 90 by a screw 107. When the shaft 90 is moved in the direction of the arrow in Fig. 6, the trigger, 92, first operates the detent 83 to turn the valve 71 upon its pivot and uncover the port 78; the trigger 93 next operates the detent 84 and its valve 72 to uncover the port 79; and finally the trigger 94 operates the detent 85 and its valve 73 to uncover the ports 80 and 81, as shown by dotted lines in Fig. 5. The positions of the triggers 92 and 93 are such that the detents 83 and 84 are released to allow the valves 71 and 72 to close the ports 78 and 79 before the valve 73 uncovers the ports 80 and 81. On the return stroke of the shaft 90, the toes 98, 99 and 100 pivot on their joints against the pressure of their springs when they contact with the detents 83, 84 and 85. The ports 78 and 79 are fitted with pipes 109 and 110 each of which is divided into the pipes 14 and 15 respectively, see Figs. 1, 16, 21 and 22. Branches 112 and 113 connect the pipes 109 and 110 to the ports 80 and 81, respectively.

Fig. 8 shows a modification whereby the valve 115 is made to lift on a spherical part, 117, formed at the top of its stem 118 and fitting a corresponding spherical bearing in the bottom of the chest. The stem, 118, has a horizontal member, 119, operated by a cam 120, fixed to the shaft 90, which in this case is made to rotate. The valve is made to close upon its seat by a spring, 121, in compression between the valve and the cover 60 and retained in position by projection 126 provided upon the cover and valve respectively.

Fig. 9 shows a further modification, whereby a detent 190, similar to detents 83, 84 and 85 is oscillated by a rotating cam 122 shaped similarly to a screw propeller, the detent being operated twice during each revolution of the cam. This modification may take the place of the parts 83 and 98: 84 and 99; 85 and 100; being repeated for each of these co-acting pairs.

The milk pail 20 (see Figs. 1 and 20) is made of any desired shape which will stand a low vacuum and is closed by a cover 123. The downpipe 27 is connected to a nozzle, 124 upon the cover by a detachable length of flexible pipe, 125.

The cups 16 and their parts are illustrated in Figs. 10 to 15 inclusive and comprise an outer metal casing, 127, made in two symmetrical parts, hinged together by joints, 128, and so shaped that when closed the two parts form a cylinder with screwed nozzles 129 and 130. In the closed position of the casing the parts are secured together by sockets 132 and 133 screwed upon the nozzles 129 and 130 respectively. The interior of the cup consists of a pouch, 134, made of india rubber and approximately cylindrical in shape. An annular chamber, 135, at the top of the pouch, extends around the pouch, through part of the greater length thereof, and communicates with a nozzle, 136, integral with the pouch. A second and larger annular chamber, 137, also surrounds the pouch, extends throughout the length thereof and communicates with a second nozzle 139, also integral with the pouch. The screwed nozzles, 129 and 130, of the casing 127, are adapted to fit around the rubber nozzles 136 and 139 respectively. The upper end of the pouch has an integral neck, 140, adapted to be turned over the top of the casing, 127, as shown in Fig. 10, where it is retained by a rubber cap, 141, provided with a hole, 142, through which the teat of the cow passes. The lower end of the pouch has an integral conical mouth piece, 144, wherein fits a metal nozzle, 145, having an integral neck, 146, adapted to fit the flexible pipe 22. Above the end of the said flexible pipe a glass tube, 147, is cemented inside the neck, 146, and apertures, 151 are made in the neck to enable the flow of milk from the teat to be observed.

Figs. 16, 17 and 18 show a modified form of controller, which consists of a hollow cylinder 148, provided with ports 149 and 150 for admission of compressed air from the pipe 10 and a port 152, communicating with the vacuum pipe 19. Ports 153 and 154 form communications between the pipes 109 and 110 leading to the teat cups, and chambers 156 and 157, formed in the sides of the cylinder 148. The said cylinder, 148, is fitted with a cylindrical valve, 158, rotated (in the direction shown by the arrow) by spur wheels 159 and 160 when quick speed is desired, or by spur wheels 161 and 162 when slow speed is desired, the shaft 163 being provided with a pulley 164 to receive the belt, 12, and with a clutch, 165, adapted to engage the boss 166 or 167 of the wheels 159 and 161, respectively. The clutch is driven by a feather upon the shaft and the wheels 159 and 161 are mounted loosely on their shaft in a well known manner. The valve, 158, has ports 169, 170, 171 and 172 which, during the rotation of the valve, successively form communications between the ports 149, 150, 152, 153 and 154, to admit and exhaust air to and from the teat cups.

By referring to Fig. 17 it will be seen that the port 169 has traveled beyond the port 149 after making communications between the port 149 and the chamber 156, thus allowing compressed air to pass into the pipe 109, communicating with the annular chamber 135 of the teat cup 16. The port 172 is open to the port 150 and will shortly be open to chamber 157, when compressed air will pass to the pipe 110 communicating with the annular chamber 137 of the teat cup 16. The port 170 is next in succession and will form communication between the port 152 and the chamber 156 and thereby allow the air to escape from the pipe 109, after having done work in the annular chamber 135 to the vacuum pipe 19. Similarly the port 171 will form communication between the port 152 and the chamber 157 and allow air to escape from the pipe 110 to the vacuum pipe 19. These operations are repeated at each rotation of the valve.

The pipes 14 and 15 are readily detachable from the pipes 109 and 110 by means of a coupling shown in Figs. 1, 16, 21 and 22. Nipples 175 and 176 fit into flexible pipes 177 and 178 attached to the said pipes 109 and 110 and have sloping slots, 179 adapted to engage pins 180 projecting radially from the head 181 of a union 182. The base, 183, of the union is hollow and has nipples, 184 adapted to enter the pipes 14 and 15. A rubber washer, 185, makes an air tight joint between the union and its nipple, which are readily disconnected by releasing the pins 180 from the slots 179.

The operation of the apparatus is as follows:—The pump having compressed air into the receiver 8 and exhausted air from the vacuum vessel 18, the cups 16 are adjusted upon the teats of the cow. The controller is put into operation by reciprocating the shaft 90 and the valve 71 operated by the shaft 90 and the detent 92 admitting compressed air to the annular chamber 135 of the pouch 134. The upper part of the teat is thereby compressed and during this compression of the teat the valve 72 is opened by the movement of the shaft 90 and the detent 93 to admit air to the annular chamber 137. The remainder of the teat is thus compressed to expel the milk which passes through the tube 22 into the milk pail 20. (See Fig. 1). The valves 71 and 72 then close by the return of the shaft and the valve 73 is opened to allow air to exhaust from the teat cups into the vacuum vessel. The shaft 90 returns to its original position and the cycle of operations is repeated as long as required to milk the cow. The cups are retained upon the teat of the cow by the vacuum set up in the milk pail, the vacuum being sufficient for this purpose, but too low to draw milk from the teat. We have found that a vacuum of about five inches of mercury will keep the cups securely in position but will not draw milk from the teats of the cow. In order that there may be a free flow of milk from the teat cup, we provide a small hole, 188, in the nozzle 145 (see Fig. 14) and a pivoted cover 189 whereby the said hole may be covered more or less as required to allow sufficient air to enter the nozzle 145 for the purpose of providing a free flow for the milk, but insufficient to destroy the vacuum in the cups.

We have shown apparatus for milking one cow, but pipes 10 and 19 and the shaft 90 may be extended to other cow stalls provided with other controllers, teat cups and milk pails, all operated by the pump 1.

Having thus described our invention, what we claim as new and desire to secure by Letters Patent is:—

1. Apparatus for the purpose indicated, comprising a teat-cup designed to receive the teat of a cow, said cup having a metal casing and a pouch with superposed annular chambers, means for supplying air under pulsative pressure to said chambers independently, means whereby a vacuum is created in the pouch for the purpose of retaining the cup upon the teat and means whereby the pressure is applied first to the upper part of the teat, then to the lower part thereof, substantially as set forth.

2. Apparatus for the purpose indicated, comprising a teat cup designed to receive the teat of a cow, said cup having a metal casing and a pouch with superposed annular chambers, means for supplying air under pulsative pressure to said chambers independently and means whereby a vacuum is created in the pouch for the purpose of retaining the cup upon the teat, substantially as set forth.

3. Apparatus for the purpose indicated, comprising in combination, a teat cup designed to receive the teat of a cow, said cup having a metal casing and superposed annular chambers, a controller for alternately admitting air to, and releasing air from the chambers and comprising distinct parts for operating the several chambers, and independent pipes connecting each of said parts of the controller with the corresponding annular chamber, and means whereby a vacuum is created in the pouch for the purpose of retaining the cup upon the teat, substantially as set forth.

4. Apparatus for the purpose indicated, comprising in combination, a teat cup designed to receive the teat of a cow, said cup having a metal casing and a pouch containing annular chambers, a controller divided into three valve chests having ports, valves adapted to cover the said ports, means for operating the valves successively, means for supplying air under pressure to two of said valve chests, means for exhausting air from the third valve chest and necessary connection between said annular chambers and said valve chests respectively, substantially as set forth.

5. In apparatus for the purpose indicated, a teat cup comprising a metal casing in two parts hinged together, screwed nipples in two parts integral with the said parts of the casing, sockets screwed upon the said nipples, a flexible pouch within and supported by casing, means for supplying air under pulsative pressure to chambers in said pouch, and means whereby a vacuum is created in the pouch for the purpose of retaining the cup upon the teat, substantially as set forth.

6. In apparatus for the purpose indicated, a receiver supplied with air under pressure, a controller divided into valve chests, valves in the valve chests, a bifurcated pipe connecting the receiver and the first and second valve chests of the controller, means for operating the valves to open and close successively, ports in the said valve chests, a teat cup adapted to fit upon the teat of a cow, said cup having a pouch, independent pipes connecting the ports of the valve chest to annular chambers in the pouch, and means for exhausting the air from the said pipes, substantially as set forth.

7. In apparatus for the purpose indicated, a controller divided into valve chests having ports, spring operated valves in the valve chests adapted to open and close the said ports, stems pivoting the valves in the valve chests, detents secured upon the valve stems, a reciprocating shaft, triggers having spring operated toes and located upon the shaft in positions to operate the valves successively, substantially as set forth.

8. In apparatus for the purpose indicated, a controller divided into valve chests having ports, valves in the valve chests, the first and second of said valve chests receiving air under pressure and the third chest being exhausted of air, means for operating the valves to open and close the ports successively, pipes leading from two of said ports, and branch pipes exhausting into the third valve chest when the third valve is operated, substantially as set forth.

9. In apparatus for the purpose indicated, a teat cup comprising an outer casing in two parts hinged together, a flexible pouch fitting the casing and having an annular chamber near the top, an annular chamber superposed upon the first chamber, and extending throughout the length of the casing, integral nipples communicating with the annular chambers, an integral neck adapted to fold over the top of the casing and a cap fitting upon the said neck and having a hole through which the cow's teat passes, substantially as set forth.

10. In apparatus for the purpose indicated, a teat cup comprising an outer casing, a flexible pouch fitting the casing, a conical mouth integral with the bottom of the pouch, and a metal nozzle fitting the said mouth, and a pivoted cover adapted to close a vent hole in the said nozzle, substantially as set forth.

In testimony whereof we have signed our names to this specification in the presence of two witnesses.

ROBERT ANDREW WIGGINS
CHARLES BRISTOW.

Witnesses:
ERNEST SMITH BALDWIN,
HENRIETT RAYWARD.